US006212550B1

(12) United States Patent
Segur

(10) Patent No.: US 6,212,550 B1
(45) Date of Patent: *Apr. 3, 2001

(54) METHOD AND SYSTEM IN A CLIENT-SERVER FOR AUTOMATICALLY CONVERTING MESSAGES FROM A FIRST FORMAT TO A SECOND FORMAT COMPATIBLE WITH A MESSAGE RETRIEVING DEVICE

(75) Inventor: Shawn Thomas Segur, Schaumburg, IL (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/786,579

(22) Filed: Jan. 21, 1997

(51) Int. Cl.[7] .................................................. G06F 15/16
(52) U.S. Cl. .......................... 709/206; 709/203; 709/205; 709/227; 709/246; 455/4.1; 455/4.2; 455/412; 455/461; 707/10
(58) Field of Search .......................... 395/200.3–200.33, 395/200.35, 200.36, 200.37, 200.56, 200.59, 200.58, 200.75, 200.76; 709/200–203, 205–207, 220, 226–228, 245–246; 707/10, 103–104; 453/4.1, 4.2, 412, 445, 456–458, 461–463; 348/13–16

(56) References Cited

U.S. PATENT DOCUMENTS

| | | | |
|---|---|---|---|
| 5,473,143 | * 12/1995 | Vak et al. | 235/380 |
| 5,513,126 | * 4/1996 | Harkins et al. | 709/228 |
| 5,594,658 | * 1/1997 | Lemaire et al. | 709/245 |
| 5,647,002 | * 7/1997 | Brunson | 709/206 |
| 5,659,596 | * 8/1997 | Dunn | 455/456 |
| 5,675,507 | * 10/1997 | Bobo, II | 709/206 |
| 5,721,827 | * 2/1998 | Logan et al. | 709/217 |
| 5,742,905 | * 4/1998 | Pepe et al. | 455/461 |
| 5,802,314 | * 9/1998 | Tullis et al. | 709/246 |
| 5,822,526 | * 10/1998 | Waskiewicz | 709/206 |
| 5,826,023 | * 10/1998 | Hall et al. | 709/206 |
| 5,848,415 | * 12/1998 | Guck | 707/10 |
| 6,058,422 | * 5/2000 | Ayanoglu et al. | 709/226 |

* cited by examiner

*Primary Examiner*—Zarni Maung
*Assistant Examiner*—Bharat Barot
(74) *Attorney, Agent, or Firm*—Douglas D. Fekete

(57) ABSTRACT

A multi-format communications client-server (50) has a number of communication interfaces (52–64). A controller and processor (68) is coupled to each of the communication interfaces (52–64) and convert messages from a first communication format to a second communication format. A memory (70) is coupled to the controller and processor (68) and the communication interfaces (52–64). The memory (70) stores a number of messages in a number of communication formats.

25 Claims, 4 Drawing Sheets

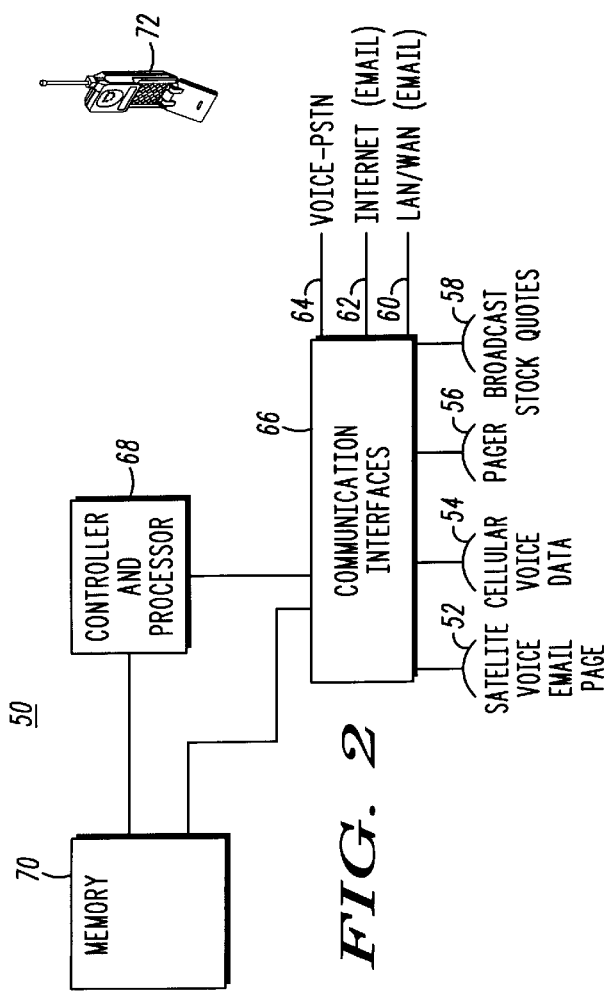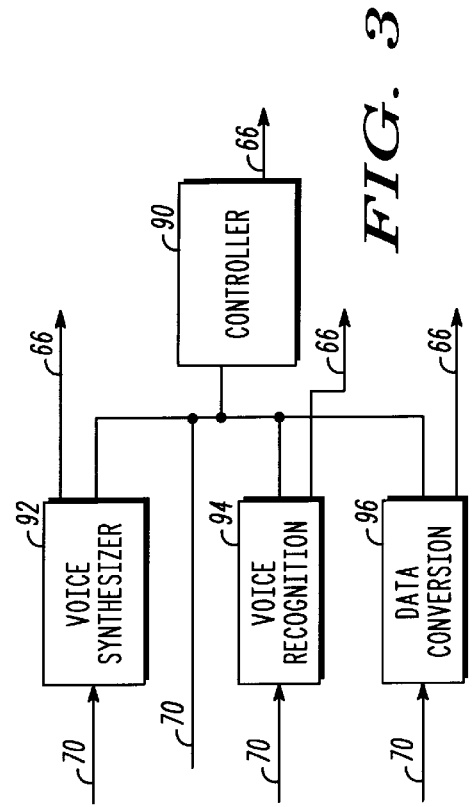

METHOD AND SYSTEM IN A CLIENT-SERVER FOR AUTOMATICALLY CONVERTING MESSAGES FROM A FIRST FORMAT TO A SECOND FORMAT COMPATIBLE WITH A MESSAGE RETRIEVING DEVICE

FIELD OF THE INVENTION

The invention relates generally to the field of communication systems, and more particularly to a multi-format communications client-server and method.

BACKGROUND OF THE INVENTION

Today's executive has a number of choices for staying in touch with others. For instance, he may have voice mail, electronic mail (email), a cellular phone, a pager, a facsimile (fax), a personal digital assistant (PDA) and soon he may have a satellite phone or terminal. In addition, an executive can often have a home phone number, an office phone number, a cellular telephone number, a work fax number, a home fax number, a standard email address, a radio email address, a pager telephone number, a business standard mail address, a home mail address and soon may have a satellite phone number or email address. This confusing array of potential sources of messages often forces the modern executive to spend a great deal of time just to discover all his messages.

One solution that has been proposed is a single telephone number that travels with the user. In this solution the telephone number is fixed to the person and not to a physical location. While this may reduce the number of different telephone numbers, it will not help with email, pagers and many of the other ways in which a modern executive receives messages.

Thus there exists a need for a system and method that can bring order to the chaos of potential message sources.

BRIEF DESCRIPTION OF THE PREFERRED EMBODIMENTS

FIG. 2 is a block diagram of the multi-format communications client-server;

FIG. 3 is a schematic diagram of the processor and controller of the multi-format communications client-server;

DETAILED DESCRIPTION OF THE DRAWINGS

The invention uses a centralized, multi-format communications client server to store messages in a plurality of communication formats (multiple format communication messages, plurality of formats). The messages are received by a plurality of communication interfaces. A controller and processor converts the stored message from a first communication format to a second communication format used by a subscriber requesting access to his messages.

Figure 1:
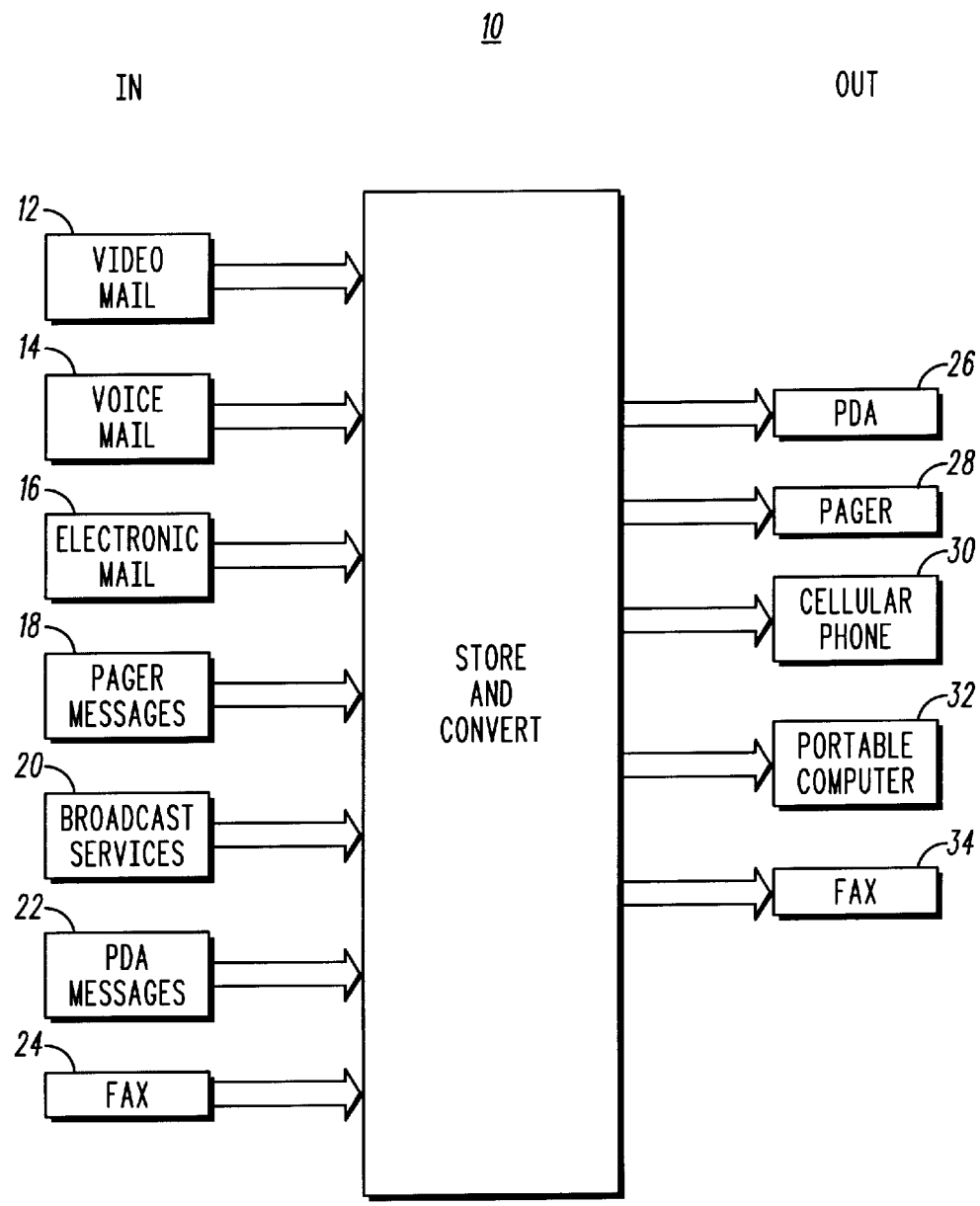
FIG. 1 is a schematic diagram of a multi-format communications client-server.

FIG. 1 is a schematic diagram of a multi-format communications client-server 10. The client-server 10 receives messages from a variety of sources in a variety of communication formats (plurality of data formats). For instance, a subscriber may receive video mail messages 12, voice mail messages 14, electronic mail messages 16, pager messages 18, broadcast service messages 20, PDA messages 22 and fax messages 24. Broadcast service messages 20 includes stock quotes, futures quotes and other time critical information, which are often transmitted over radio frequency channels. Ideally all the messages to a subscriber, in whatever format, are stored in the client server 10. The client server 10 could be a centralized location or could be a network of message storing servers. When a subscriber desires access to his messages, he transmits a retrieval query from any of a plurality of message receiving devices 26–34 to the client-server 10. The message receiving devices 26–34 include, PDAs 26, pagers 28, cellular phones (cellular voice, cellular voice data) 30, portable computers 32, and fax machines 34. The client-server 10 senses the return address (routing address), communication data format and communication channel of the message receiving device (subscriber unit) 26–34. The client-server 10 then sends a summary of the stored messages, including any priority information. The subscriber can then select the stored messages he wants transmitted to him. The client-server converts the selected messages to the data format of the subscriber device and transmits the messages to the subscriber unit.

FIG. 2 is a block diagram of an embodiment of the multi-format communications client-server 50. The client-server's 50 connection to the world of messages is a plurality of communication interfaces 52–64. These communication interfaces include, but are not limited to a pager data interface, a voice data interface, a cellular digital pocket data interface and an electronic mail interface, and are implemented with, for example: satellite communication channels 52 for pagers, voice messages, and text messages (e.g., email); cellular (PCS) communication channels 54 for voice and cellular digital packet data messages (cellular digital packet data); Radio frequency communication channels 56, 58 for standard pagers and broadcast services (e.g., stock quotes); data networks (WANs, LANs) 60 for text messages (email), video messages, and voice messages; public internet connections 62 for text messages (email), video messages, and voice messages; and public switched telephone network channels (public switched telephone network voice) 64 for voice and data messages. The communication interfaces 52–64 and their associated electronics 66 are coupled to a controller and processor 68. The controller and processor 68 handles the overhead functions of the client server 50 and converts messages from a first communication format to a second communication format. A memory 70 is coupled to both the communication interfaces electronics 66 and the controller and processor 68. The memory 70 is used to store the plurality of messages. The client 72 or subscriber unit is coupled to at least one of the communication interfaces 52–64.

FIG. 3 is a schematic diagram of the processor and controller 68 of the multi-format communications client-server of FIG. 2. A controller 90 coordinates the overall activities of the processors 92–96 and the other parts of the client-server 50. A voice synthesizer 92 is coupled to the controller 90, to the memory 70 and to the communication interface electronics 66. The voice synthesizer 92 converts stored text messages (e.g., email, fax) to voiced messages. The voice recognition processor 94 converts voice messages (audio messages, voice mail) to text messages. The data conversion processor 96 converts messages in a first data format to a second data format. For instance, the data conversion processor would convert from a pager data format (pager data) to an email data format.

Figure 4:
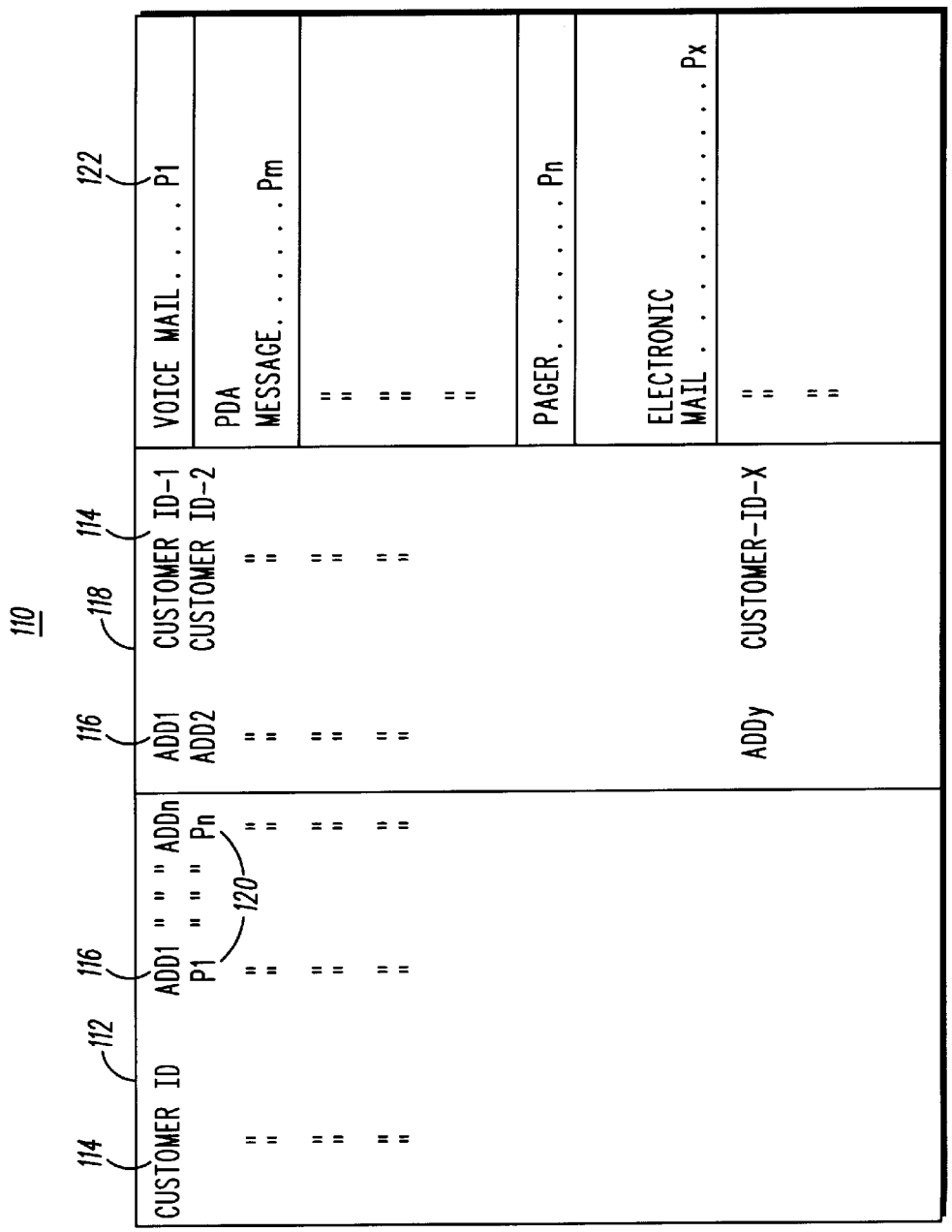
FIG. 4 is a schematic diagram of an embodiment of a data format used by the multi-format communications client-server.

FIG. 4 is a schematic diagram of an embodiment of a data format 110 used by the multi-format communications client-server. The data format 110 has a conversion table 112 between every customer (subscriber) ID 114 and the subscriber's plurality of addresses 116. A subscriber's plurality of addresses include their email address (electronic mail address), pager number, cellular telephone number, cellular digital packet data address, personal digital assistant address, etc. Another table 118 converts from the addresses 116 to the customer IDs 114. The first conversion table 112 includes a pointer (plurality of pointers) 120 associated with each of the addresses 116 for each customer ID 114. The pointer (P1) 122 associated with the first address, points to the location in memory where messages in the format associated with the first address are stored. For instance the first address might be a subscriber's voice mail telephone number, then the subscriber's voice mail messages would be found at the location indicated by the first pointer 122. Other information may also be stored at this location, such as the subscriber's voice greeting (greeting message). This format is repeated for all the message formats.

Figure 5:
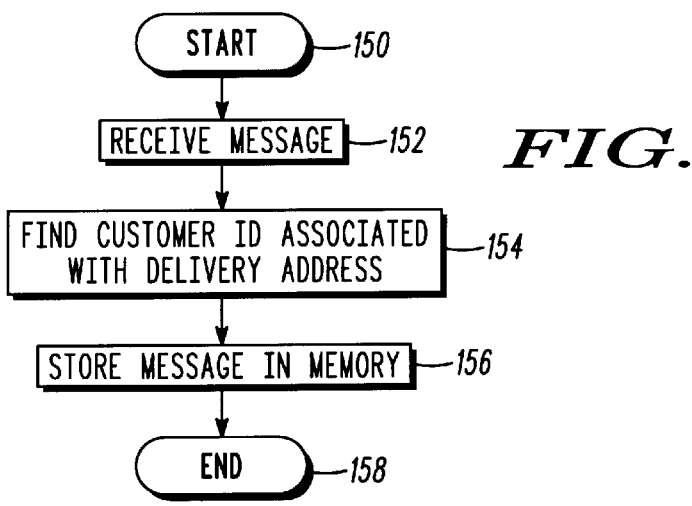
FIG. 5 is a flow chart of an embodiment of the steps of storing a message by the multi-format communications client-server.

FIG. 5 is a flow chart of an embodiment of the steps of storing a message by the multi-format communications client-server. The process starts at step 150, by the client server receiving a message (message query) at step 152. The message is intended for one of the subscribers and the customer ID is found by matching the delivery address to one of the plurality of customer IDs in the conversion table 118, at step 154. Once the customer ID is found, the message is stored in the appropriate segment of memory and a pointer to the message is stored with the address in table 112, at step 156. This ends the process at step 158.

Figure 6:
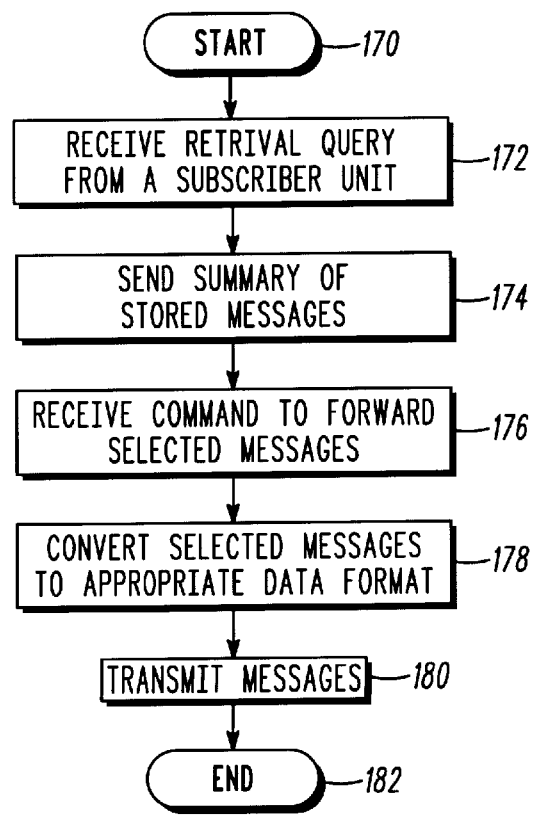
FIG. 6 is a flow chart of an embodiment of the steps of retrieving a message.

FIG. 6 is a flow chart of an embodiment of the steps of retrieving a message. The process starts, step 170, by the server receiving a retrieval query from the subscriber unit, at step 172. The server analyzes a header associated with each of the selected messages to determine a sender ID. The server then sends a summary of the stored messages (plurality of stored messages), including the number of the plurality of stored messages and an indicator of the sender to the client at step 174. The summary might include priority codes for each message. The priority codes can be based on the sender placing a priority code on the message or the user can set flags that messages from certain people (addresses) receive a priority code. The invention also contemplates the use of software agents, which can analyze the content of messages for high priority words or in voice messages can detect stress in the caller's voice. The messages can be ordered according to priority or the priority messages are highlighted. The user then selects certain messages (option, selected message) to review and the server receives a command (transmit selected message command) to forward selected messages (message indicator) at step 176. The server then converts the selected messages into the data format (translated message) used by the subscriber unit at step 178. This conversion process in certain cases also includes editing. For instance, email messages would need to be edited before being sent to a pager. Video mail messages are converted so that only the voice is sent to a telephone and only the audio is translated into text. Once the conversion is complete, the messages are transmitted to the subscriber unit at step 180, which ends the process at step 182.

The invention allows a user to broadcast messages to several people simultaneously. In one embodiment digital assistants search for relevant information, as defined by the user, on the internet for instance. Any information considered relevant is forwarded to the user's message center. In another embodiment digital assistants notice patterns used by the user and anticipate the user's desires. For instance, if a user always reviews certain stock prices first in the morning, these stock prices (from a broadcast service) are displayed first on the menu (message option menu) during the morning.

Thus there has been described a multi-format communications client-server and method that reduces the number of potential message source and translates these messages to the format presently required by the user. By having the messages aggregated, priorities for responding to the messages can be easily determined. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A multi-format communications client-server, comprising:

a plurality of communication interfaces in communication with one or more subscriber units, a communication interface adapted to receive one or more audio/visual messages from at least a first of the one or more of the subscriber units and to transmit a selected one or more messages to at least a second of the one or more of the subscriber units;

a controller and processor coupled to the plurality of communication interfaces, the controller and processor configured to sense a return address and data format of the first of the one or more subscriber units and for automatically converting one or more of the received messages from a first communication format to a second communication format in response to a message retrieval query from the second of the one or more of the subscriber units instructing the communication interface to transmit the selected messages from the communication interface to the querying subscriber units, wherein the second communication format is compatible with the data format of a subscriber unit generating the message retrieval query.

2. The multi-format communications client-server of claim 1, wherein the first or second communication formats includes a pager data format.

3. The multi-format communications client-server of claim 1, wherein the first or second communication formats includes an electronic mail format.

4. The multi-format communications client-server of claim 1, wherein the controller and processor includes a voice synthesizer.

5. The multi-format communications client-server of claim 1, wherein the controller and processor includes a voice recognition processor.

6. The multi-format communications client-server of claim 1, wherein the controller and processor includes a data conversion processor.

7. The multi-format communications client-server of claim 1, wherein the controller and processor includes a memory for storing a plurality of customer IDs.

8. The multi-format communications client-server of claim 7, wherein the memory stores a plurality of addresses, each of the plurality of address associated with one of the plurality of customer IDs.

9. The multi-format communications client-server of claim 8, wherein each of the plurality of addresses are associated with one of the first or second communications formats.

10. The multi-format communications client-server of claim 8, wherein one of the plurality of addresses is a cellular telephone number.

11. The multi-format communications client-server of claim 8, wherein one of the plurality of addresses is an electronic mail address.

12. The multi-format communications client-server of claim 8, wherein one of the plurality of addresses is a pager number.

13. The multi-format communications client-server of claim 8, wherein one of the plurality of addresses is a personal digital assistant address.

14. A method of sending, receiving and converting multiple format communication messages, comprising the steps of:

(a) receiving a message in one of a plurality of data formats including audio/visual messages, the message containing a delivery address for specifying delivery to one or more subscriber units;

(b) determining a customer ID associated with the delivery address;

(c) storing the message in a memory at a location associated with the customer ID (d) receiving a transmit selected message command from one of the one or more subscriber units for selecting a message to be transmitted to the one subscriber unit;

(e) automatically determining a return address and data format of the one subscriber unit and converting the selected message into a data format compatible with the one subscriber unit; and (f) transmitting the converted message to the one subscriber unit.

15. The method of claim 14, wherein step (a) further includes the steps of:

(a1) receiving a message query;

(a2) transmitting a greeting message and a message option menu;

(a3) selecting an option from the message option menu.

16. The method of claim 14, further including the steps of:

g receiving a retrieval query containing a routing address in a first data format from a subscriber unit;

h sending a summary of a plurality of stored messages to the subscriber unit.

17. The method of claim 13, wherein step (e) includes the step of:

(e1) retrieving the selected message from the memory.

18. The method of claim 14, wherein step h includes the steps of:

(h1) correlating the routing address to a customer ID; and (h2) searching a plurality of pointers to determine a location of the plurality of stored messages and a number of the plurality of stored messages.

19. The method of claim 18, further including the step of:

(h3) analyzing a header associated with each of the plurality of stored messages to determine a sender ID.

20. The method of claim 16, wherein step (h) includes the step of:

(h1) selecting a sender ID for inclusion in the summary.

21. A multi-format communications client-server, comprising;

a plurality of communication interfaces for receiving a plurality of messages in a plurality of formats including audio/visual formats;

a controller and one or more subscriber units coupled to each of the plurality of communication interfaces;

a memory coupled to the controller for storing a plurality of messages in a plurality of formats; and a processor coupled to the memory for automatically determining a return address and data format of a subscriber unit and converting one of the plurality of messages from a first of the plurality of formats to a second of the plurality of formats wherein the second of the plurality of formats is in the data format compatible with a subscriber unit requesting retrieval of one of the stored messages.

22. The multi-format communications client-server of claim 21, wherein the plurality of communication interfaces includes a pager data interface.

23. The multi-format communications client-server of claim 21, wherein the plurality of communication interfaces includes a cellular voice data interface.

24. The multi-format communications client-server of claim 21, wherein the plurality of communication interfaces includes a cellular digital packet data interface.

25. The multi-format communications client-server of claim 21, wherein the plurality of communication interfaces includes an electronic mail interface.

* * * * *